US009115435B2

(12) United States Patent
McGrail et al.

(10) Patent No.: US 9,115,435 B2
(45) Date of Patent: *Aug. 25, 2015

(54) METHODS FOR ASSOCIATING OR DISSOCIATING GUEST MATERIALS WITH A METAL ORGANIC FRAMEWORK, SYSTEMS FOR ASSOCIATING OR DISSOCIATING GUEST MATERIALS WITHIN A SERIES OF METAL ORGANIC FRAMEWORKS, AND GAS SEPARATION ASSEMBLIES

(71) Applicant: Battelle Memorial Institute, Richland, WA (US)

(72) Inventors: B. Peter McGrail, Richland, WA (US); Praveen K. Thallapally, Richland, WA (US); Wu Xu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 83 days.

This patent is subject to a terminal disclaimer.

(21) Appl. No.: 13/829,615

(22) Filed: Mar. 14, 2013

(65) Prior Publication Data

US 2013/0199940 A1    Aug. 8, 2013

Related U.S. Application Data

(63) Continuation of application No. 13/078,548, filed on Apr. 1, 2011, now Pat. No. 8,425,662.

(60) Provisional application No. 60/320,445, filed on Apr. 2, 2010.

(51) Int. Cl.
*B01D 53/04* (2006.01)
*B01D 53/62* (2006.01)
(Continued)

(52) U.S. Cl.
CPC ............... *C25B 15/00* (2013.01); *B01D 53/02* (2013.01); *B01D 53/04* (2013.01); *B01D 53/1475* (2013.01); *B01D 53/32* (2013.01); *B01D 53/326* (2013.01); *F23J 15/02* (2013.01);
(Continued)

(58) Field of Classification Search
USPC ............... 96/121, 143; 95/139, 148; 502/526; 423/230; 204/267; 205/763
See application file for complete search history.

(56) References Cited

U.S. PATENT DOCUMENTS 5,614,576 A    3/1997 Rutherford
5,621,654 A    4/1997 Cohen
(Continued)

FOREIGN PATENT DOCUMENTS

EP    2087916 A1    8/2009

OTHER PUBLICATIONS

PCT/US2011/030960 IPRP, Oct. 2, 2012, Battelle Memorial Institute.
(Continued)

*Primary Examiner* — Frank Lawrence
(74) *Attorney, Agent, or Firm* — Wells St. John P.S.

(57) ABSTRACT

Methods for releasing associated guest materials from a metal organic framework are provided. Methods for associating guest materials with a metal organic framework are also provided. Methods are provided for selectively associating or dissociating guest materials with a metal organic framework. Systems for associating or dissociating guest materials within a series of metal organic frameworks are provided. Gas separation assemblies are provided.

16 Claims, 9 Drawing Sheets

(51) Int. Cl.
*C25B 15/00* (2006.01)
*B01D 53/02* (2006.01)
*B01D 53/14* (2006.01)
*B01D 53/32* (2006.01)
*F23J 15/02* (2006.01)

(52) U.S. Cl.
CPC ..... *B01D2253/204* (2013.01); *B01D 2257/504* (2013.01); *B01D 2259/40083* (2013.01); *F23J 2215/50* (2013.01); *F23J 2219/60* (2013.01); *Y02C 10/06* (2013.01); *Y02C 10/08* (2013.01)

(56) References Cited

U.S. PATENT DOCUMENTS

| | | |
|---|---|---|
| 5,648,508 A | 7/1997 | Yaghi |
| 5,650,415 A | 7/1997 | Tang |
| 5,753,364 A | 5/1998 | Rutherford |
| 5,773,459 A | 6/1998 | Tang |
| 5,891,917 A | 4/1999 | Tang |
| 5,935,993 A | 8/1999 | Tang |
| 5,972,077 A | 10/1999 | Judkins |
| 6,017,697 A | 1/2000 | Burnett, Jr. |
| 6,017,703 A | 1/2000 | Kinders |
| 6,221,621 B1 | 4/2001 | Kinders |
| 6,225,346 B1 | 5/2001 | Tang |
| 6,294,380 B1 | 9/2001 | Qiang |
| 6,355,793 B1 | 3/2002 | Lin |
| 6,491,740 B1 | 12/2002 | Wang |
| 6,556,273 B1 | 4/2003 | Wheeler |
| 6,617,467 B1 | 9/2003 | Muller |
| 6,712,802 B1 | 3/2004 | Cairns |
| 6,818,291 B2 | 11/2004 | Funkenbusch |
| 6,821,616 B1 | 11/2004 | Sakurai |
| 6,828,588 B2 | 12/2004 | Sakurai |
| 6,863,781 B2 | 3/2005 | Nocera et al. |
| 6,878,838 B2 | 4/2005 | Lin |
| 6,893,564 B2 | 5/2005 | Mueller |
| 6,929,679 B2 | 8/2005 | Muller |
| 6,929,864 B2 | 8/2005 | Fleming |
| 6,930,193 B2 | 8/2005 | Yaghi |
| 6,933,051 B2 | 8/2005 | Fleming |
| 6,933,136 B2 | 8/2005 | Simensen |
| 6,965,026 B2 | 11/2005 | Zaworotko |
| 6,965,125 B2 | 11/2005 | Sakurai |
| 7,008,607 B2 | 3/2006 | Muller |
| 7,026,138 B1 | 4/2006 | de Sauvage |
| 7,041,789 B2 | 5/2006 | Hinuma |
| 7,094,789 B2 | 8/2006 | Yamada |
| 7,119,219 B2 | 10/2006 | Mueller |
| 7,160,894 B2 | 1/2007 | Yamada |
| 7,166,150 B2 | 1/2007 | Torgersen |
| 7,179,765 B2 | 2/2007 | Muller |
| 7,192,723 B2 | 3/2007 | Watanabe |
| 7,196,210 B2 | 3/2007 | Yaghi |
| 7,202,385 B2 | 4/2007 | Mueller |
| 7,215,385 B2 | 5/2007 | Onomatsu |
| 7,215,473 B2 | 5/2007 | Fleming |
| 7,217,808 B2 | 5/2007 | Hinuma |
| 7,261,950 B2 | 8/2007 | Fleming |
| 7,279,517 B2 | 10/2007 | Mueller |
| 7,309,380 B2 | 12/2007 | Muller |
| 7,322,731 B2 | 1/2008 | Epstein |
| 7,343,747 B2 | 3/2008 | Muller |
| 7,351,479 B2 | 4/2008 | Funkenbusch |
| 7,393,557 B2 | 7/2008 | Fleming |
| 7,436,469 B2 | 10/2008 | Gehlsen |
| 7,441,574 B2 | 10/2008 | Koster |
| 7,446,827 B2 | 11/2008 | Ko |
| 7,481,866 B2 | 1/2009 | MacGillivray |
| 7,485,603 B2 | 2/2009 | Bera |
| 7,524,444 B2 | 4/2009 | Hesse |
| 7,534,303 B2 | 5/2009 | Mueller |
| 7,553,352 B2 | 6/2009 | Mueller |
| 7,556,673 B2 | 7/2009 | Schubert |
| 7,574,996 B2 | 8/2009 | Hasenauer |
| 7,582,798 B2 | 9/2009 | Yaghi |
| 7,604,929 B2 | 10/2009 | Dryden |
| 7,618,984 B2 | 11/2009 | Yamada |
| 7,637,983 B1 | 12/2009 | Liu |
| 7,652,132 B2 | 1/2010 | Yaghi |
| 7,658,784 B2 | 2/2010 | Fritsch |
| 7,662,574 B2 | 2/2010 | Watanabe |
| 7,662,746 B2 | 2/2010 | Yaghi |
| 7,674,320 B2 | 3/2010 | Vadivelu |
| 7,687,432 B2 | 3/2010 | Zhou |
| 7,691,383 B2 | 4/2010 | Chakrabarty |
| 7,691,973 B2 | 4/2010 | de Sauvage |
| 7,710,511 B2 | 5/2010 | Gehlsen |
| 7,712,613 B2 | 5/2010 | Bahm |
| 7,727,960 B2 | 6/2010 | Hummel |
| 7,744,842 B2 | 6/2010 | Farha |
| 7,750,574 B2 | 7/2010 | Saito |
| 7,777,061 B2 | 8/2010 | Schubert |
| 7,777,832 B2 | 8/2010 | Richard |
| 7,788,038 B2 | 8/2010 | Oshita |
| 7,789,943 B2 | 9/2010 | Zhou |
| 7,795,175 B2 | 9/2010 | Olah |
| 7,799,120 B2 | 9/2010 | Yaghi |
| 7,807,745 B2 | 10/2010 | Agarwal |
| 7,815,712 B2 | 10/2010 | Liu |
| 7,815,716 B2 | 10/2010 | Muller |
| 7,820,282 B2 | 10/2010 | Haas |
| 7,824,473 B2 | 11/2010 | Mirkin |
| 7,838,056 B2 | 11/2010 | Forgac |
| 7,842,827 B2 | 11/2010 | Schubert |
| 7,846,568 B2 | 12/2010 | Norimatsu |
| 7,847,115 B2 | 12/2010 | Schubert |
| 7,855,299 B2 | 12/2010 | Jhung |
| 7,862,647 B2 | 1/2011 | Hupp |
| 7,866,638 B2 | 1/2011 | Neumann |
| 7,879,221 B2 | 2/2011 | Putter |
| 7,880,026 B2 | 2/2011 | Ni |
| 7,883,750 B2 | 2/2011 | Saito |
| 7,903,194 B2 | 3/2011 | Epstein |
| 7,906,096 B2 | 3/2011 | Bae |
| 7,910,732 B2 | 3/2011 | Schubert |
| 7,922,008 B2 | 4/2011 | Bahm |
| 7,924,368 B2 | 4/2011 | Fabick |
| 7,931,960 B2 | 4/2011 | Hesse |
| 7,951,749 B2 | 5/2011 | Yang |
| 7,968,739 B2 | 6/2011 | Muller |
| 7,977,277 B2 | 7/2011 | Giannantonio |
| 7,998,246 B2 | 8/2011 | Liu |
| 8,003,073 B2 | 8/2011 | Pez |
| 8,023,065 B2 | 9/2011 | Epstein |
| 8,029,857 B2 | 10/2011 | Hoek |
| 8,034,952 B2 | 10/2011 | Eddaoudi |
| 8,048,198 B2 | 11/2011 | Liu |
| 8,057,584 B2 | 11/2011 | Schubert |
| 8,071,063 B2 | 12/2011 | Reyes |
| 8,071,623 B2 | 12/2011 | Jones |
| 8,071,810 B2 | 12/2011 | Schnatbaum |
| 8,093,350 B2 | 1/2012 | Jung |
| 8,100,151 B2 | 1/2012 | Handa |
| 8,105,419 B2 | 1/2012 | Neumann |
| 8,114,195 B2 | 2/2012 | Ni et al. |
| 8,115,024 B2 | 2/2012 | Schubert |
| 8,123,834 B2 | 2/2012 | Masel |
| 8,124,660 B2 | 2/2012 | de Figueiredo Gomes |
| 8,132,678 B2 | 3/2012 | Liu |
| 8,133,301 B2 | 3/2012 | Hwang |
| 8,133,308 B2 | 3/2012 | Lively |
| 8,142,745 B2 | 3/2012 | Reyes |
| 8,142,746 B2 | 3/2012 | Reyes |
| 8,168,813 B2 | 5/2012 | Chang |
| 8,173,827 B2 | 5/2012 | Chang |
| 8,192,527 B2 | 6/2012 | Pirngruber |
| 8,197,579 B2 | 6/2012 | Miller |
| 2004/0033493 A1 | 2/2004 | Tchernev |
| 2004/0090195 A1 | 5/2004 | Motsenbocker |
| 2004/0091967 A1 | 5/2004 | Kohler |
| 2004/0210289 A1 | 10/2004 | Wang |
| 2004/0224134 A1 | 11/2004 | Trent |

(56) References Cited

U.S. PATENT DOCUMENTS

| | | |
|---|---|---|
| 2004/0234751 A1 | 11/2004 | Sakurai |
| 2004/0254419 A1 | 12/2004 | Wang |
| 2005/0004404 A1 | 1/2005 | Muller |
| 2005/0025797 A1 | 2/2005 | Wang |
| 2005/0079132 A1 | 4/2005 | Wang |
| 2005/0104365 A1 | 5/2005 | Haas |
| 2005/0107870 A1 | 5/2005 | Wang |
| 2005/0124793 A1 | 6/2005 | Nakanishi |
| 2005/0124819 A1 | 6/2005 | Yaghi |
| 2005/0163801 A1 | 7/2005 | Mori |
| 2005/0208124 A1 | 9/2005 | Araki |
| 2005/0221330 A1 | 10/2005 | de Sauvage |
| 2005/0263453 A1 | 12/2005 | Collias |
| 2005/0279696 A1 | 12/2005 | Bahm |
| 2006/0035083 A1 | 2/2006 | Saito |
| 2006/0058346 A1 | 3/2006 | Yun-Choi |
| 2006/0170797 A1 | 8/2006 | Biernath |
| 2006/0170808 A1 | 8/2006 | Biernath |
| 2006/0173162 A1 | 8/2006 | Djurup |
| 2006/0201884 A1 | 9/2006 | Kulprathipanja |
| 2006/0216289 A1 | 9/2006 | de Sauvage |
| 2006/0246082 A1 | 11/2006 | Faure |
| 2006/0247266 A1 | 11/2006 | Yamada |
| 2006/0274244 A1 | 12/2006 | Battiato |
| 2006/0287190 A1 | 12/2006 | Eddaoudi |
| 2006/0290843 A1 | 12/2006 | Epstein |
| 2006/0290845 A1 | 12/2006 | Hebrink |
| 2007/0010702 A1 | 1/2007 | Wang |
| 2007/0031415 A1 | 2/2007 | Kinashi |
| 2007/0059687 A1 | 3/2007 | Ohno |
| 2007/0062625 A1 | 3/2007 | Koster |
| 2007/0083333 A1 | 4/2007 | Vitiello |
| 2007/0104803 A1 | 5/2007 | Chen |
| 2007/0105122 A1 | 5/2007 | Ota |
| 2007/0112015 A1 | 5/2007 | Hurt |
| 2007/0141431 A1 | 6/2007 | Wang |
| 2007/0190068 A1 | 8/2007 | Hart |
| 2007/0202038 A1 | 8/2007 | Yaghi |
| 2007/0203267 A1 | 8/2007 | Richard |
| 2007/0209505 A1 | 9/2007 | Liu |
| 2007/0236413 A1 | 10/2007 | Gehlsen |
| 2007/0236628 A1 | 10/2007 | Epstein |
| 2007/0287684 A1 | 12/2007 | Chaudry |
| 2008/0044580 A1 | 2/2008 | Marte |
| 2008/0111114 A1 | 5/2008 | Gilbert |
| 2008/0128941 A1 | 6/2008 | Lopez |
| 2008/0142440 A1 | 6/2008 | Liu |
| 2008/0161232 A1 | 7/2008 | Hummel |
| 2008/0175780 A1 | 7/2008 | Pez |
| 2008/0177098 A1 | 7/2008 | Bahnmuller |
| 2008/0190289 A1 | 8/2008 | Muller |
| 2008/0207673 A1 | 8/2008 | Xilinas |
| 2008/0210901 A1 | 9/2008 | Giannantonio |
| 2008/0217562 A1 | 9/2008 | Saito |
| 2008/0226560 A1 | 9/2008 | Das Gupta |
| 2008/0241112 A1 | 10/2008 | Westenfelder |
| 2008/0242837 A1 | 10/2008 | Khan |
| 2008/0257475 A1 | 10/2008 | Fleming |
| 2008/0292921 A1 | 11/2008 | Lakshmanan |
| 2008/0295691 A1 | 12/2008 | Liu |
| 2008/0295692 A1 | 12/2008 | Liu |
| 2008/0296527 A1 | 12/2008 | Liu |
| 2008/0299538 A1 | 12/2008 | Goodrich |
| 2008/0300336 A1 | 12/2008 | Liu |
| 2008/0300387 A1 | 12/2008 | Schubert |
| 2009/0005243 A1 | 1/2009 | Goddard |
| 2009/0032023 A1 | 2/2009 | Pastre |
| 2009/0048233 A1 | 2/2009 | Rao |
| 2009/0060839 A1 | 3/2009 | Boyes |
| 2009/0060840 A1 | 3/2009 | Boyes |
| 2009/0060890 A1 | 3/2009 | Humes |
| 2009/0062409 A1 | 3/2009 | Matzger |
| 2009/0062498 A1 | 3/2009 | Matzger |
| 2009/0062874 A1 | 3/2009 | Tracey |
| 2009/0067048 A1 | 3/2009 | Battiato |
| 2009/0068051 A1 | 3/2009 | Gross |
| 2009/0071932 A1 | 3/2009 | Floyd |
| 2009/0071933 A1 | 3/2009 | Floyd |
| 2009/0074646 A1 | 3/2009 | Sasagawa |
| 2009/0075831 A1 | 3/2009 | Russwurm |
| 2009/0081296 A1 | 3/2009 | Humes |
| 2009/0092818 A1 | 4/2009 | Kiener |
| 2009/0126566 A1 | 5/2009 | Liu |
| 2009/0126567 A1 | 5/2009 | Liu |
| 2009/0126570 A1 | 5/2009 | Liu |
| 2009/0127197 A1 | 5/2009 | Liu |
| 2009/0131242 A1 | 5/2009 | Liu |
| 2009/0152755 A1 | 6/2009 | Liu |
| 2009/0152763 A1 | 6/2009 | Liu |
| 2009/0155464 A1 | 6/2009 | Liu |
| 2009/0169857 A1 | 7/2009 | Fischer |
| 2009/0183996 A1 | 7/2009 | Richter |
| 2009/0198079 A1 | 8/2009 | Schubert |
| 2009/0229461 A1 | 9/2009 | Jeng |
| 2009/0247654 A1 | 10/2009 | Rajendran |
| 2009/0263656 A1 | 10/2009 | Chae |
| 2009/0275619 A1 | 11/2009 | Boueres |
| 2009/0277837 A1 | 11/2009 | Liu |
| 2009/0281341 A1 | 11/2009 | Schubert |
| 2009/0301902 A1 | 12/2009 | Gogotsi |
| 2009/0305040 A1 | 12/2009 | Schubert |
| 2009/0306420 A1 | 12/2009 | Schubert |
| 2010/0006454 A1 | 1/2010 | Gruenwald |
| 2010/0022791 A1 | 1/2010 | Ihm |
| 2010/0029476 A1 | 2/2010 | Trukhan |
| 2010/0034411 A1 | 2/2010 | Mellow |
| 2010/0036145 A1 | 2/2010 | Kim |
| 2010/0064888 A1 | 3/2010 | Schubert |
| 2010/0069234 A1 | 3/2010 | Willis |
| 2010/0072424 A1 | 3/2010 | Petoud |
| 2010/0075123 A1 | 3/2010 | Masel |
| 2010/0075294 A1 | 3/2010 | Dryden |
| 2010/0075295 A1 | 3/2010 | Dryden |
| 2010/0076220 A1 | 3/2010 | Schubert |
| 2010/0081186 A1 | 4/2010 | Lee |
| 2010/0093879 A1 | 4/2010 | Lloyd |
| 2010/0125957 A1 | 5/2010 | Hong |
| 2010/0126344 A1 | 5/2010 | Stein |
| 2010/0132359 A1 | 6/2010 | Minhas |
| 2010/0132549 A1 | 6/2010 | Yaghi |
| 2010/0133171 A1 | 6/2010 | Liu |
| 2010/0133280 A1 | 6/2010 | Stein |
| 2010/0143693 A1 | 6/2010 | Yaghi |
| 2010/0154635 A1 | 6/2010 | Schubert |
| 2010/0166644 A1 | 7/2010 | Schubert |
| 2010/0170393 A1 | 7/2010 | Zhou |
| 2010/0170395 A1 | 7/2010 | Farha |
| 2010/0176031 A1 | 7/2010 | Jacobson |
| 2010/0186588 A1 | 7/2010 | Yaghi |
| 2010/0200433 A1 | 8/2010 | Stahley |
| 2010/0209354 A1 | 8/2010 | Horcajada-Cortes |
| 2010/0226991 A1 | 9/2010 | Horcajada-Cortes |
| 2010/0258004 A1 | 10/2010 | Matzger |
| 2010/0269952 A1 | 10/2010 | Wynne |
| 2010/0282080 A1 | 11/2010 | Omary |
| 2010/0286022 A1 | 11/2010 | Yaghi |
| 2010/0316538 A1 | 12/2010 | Buelow |
| 2010/0319534 A1 | 12/2010 | Currier |
| 2010/0320294 A1 | 12/2010 | Neumann |
| 2010/0331436 A1 | 12/2010 | Qiu |

OTHER PUBLICATIONS

PCT/US2011/030960 SearchReport, Jun. 29, 2011, Battelle Memorial Institute.

PCT/US2011/030960 Writ. Opin., Jun. 29, 2011, Battelle Memorial Institute.

Motkuri et al., "Dehydrated Prussian Blues for $CO_2$ Storage and Separation Applications" CrystEngComm, 2010, 12, pp. 4003-4006.

METHODS FOR ASSOCIATING OR DISSOCIATING GUEST MATERIALS WITH A METAL ORGANIC FRAMEWORK, SYSTEMS FOR ASSOCIATING OR DISSOCIATING GUEST MATERIALS WITHIN A SERIES OF METAL ORGANIC FRAMEWORKS, AND GAS SEPARATION ASSEMBLIES

CROSS REFERENCE TO RELATED APPLICATION

This application is a continuation of U.S. patent application Ser. No. 13/078,548 filed Apr. 1, 2011, entitled "Methods for Associating or Dissociating Guest Materials with a Metal Organic Framework, Systems for Associating or Dissociating Guest Materials Within a Series of Metal Organic Frameworks, and Gas Separation Assemblies", now issued U.S. Pat. No. 8,425,662, which claims priority to U.S. Provisional Patent Application Ser. No. 61/320,445 which was filed on Apr. 2, 2010, the entirety of which is incorporated by reference herein.

TECHNICAL FIELD

The present disclosure relates to the use of metal organic frameworks.

BACKGROUND

Recently, metal organic frameworks have been proposed for use in various capacities. These capacities include but are not limited to the separation of molecules or materials from mixtures that include the molecules or materials. As an example, in various applications, metal organic frameworks have been proposed for use as materials that can be used to separate carbon dioxide from methane, for example.

In accordance with other applications, metal organic frameworks have also been utilized to retain certain molecules in higher density than they would be retained at when super pressurized. As an example, metal organic frameworks have been proposed for use as hydrogen storage tanks.

In these applications, in the past, the metal organic frameworks have been configured to selectively adsorb or desorb or associate or dissociate certain materials. As an example, the temperature and/or pressure of the metal organic framework can be manipulated, as well as the chemical and/or geometric structure of the metal organic framework, to facilitate either the association or adsorption, or the dissociation or desorption of the specific materials.

The present disclosure provides methods for using metal organic frameworks as well as systems that include metal organic frameworks and assemblies that include metal organic frameworks.

BRIEF DESCRIPTION OF THE DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Methods for releasing associated guest materials from a metal organic framework are provided with example methods including altering the oxidation state of at least a portion of the metal of the metal organic framework to dissociate at least a portion of the guest materials from the framework. Example methods for associating guest materials with a metal organic framework are also provided with example methods including altering the oxidation state of at least a portion of the metal of the metal organic framework to associate at least a portion of the guest materials with the framework.

Methods are provided for selectively associating or dissociating guest materials with a metal organic framework. Example methods can include altering the oxidation state of at least a portion of the metal of the metal organic framework to associate or dissociate at least a portion of the guest materials with the framework.

Systems for associating or dissociating guest materials within a series of metal organic frameworks are provided. Example systems can include at least two individual metal organic frameworks, with one of the individual metal organic frameworks configured to dissociate guest materials, and the other configured to associate guest materials. One framework can include at least some metals of one oxidation state and the other framework can include the same metals of another oxidation state.

Gas separation assemblies are provided. Example assemblies can include a plurality of individual cells housing metal organic framework, with the plurality comprising at least one series of cells and another series of cells. Each series can include at least two electrically isolated individual cells. The assemblies can also include a channel between the one series of cells and the other series of cells. Power sources and a controller coupled to both the assembly and the power source can also be included in certain embodiments.

Figure 1:
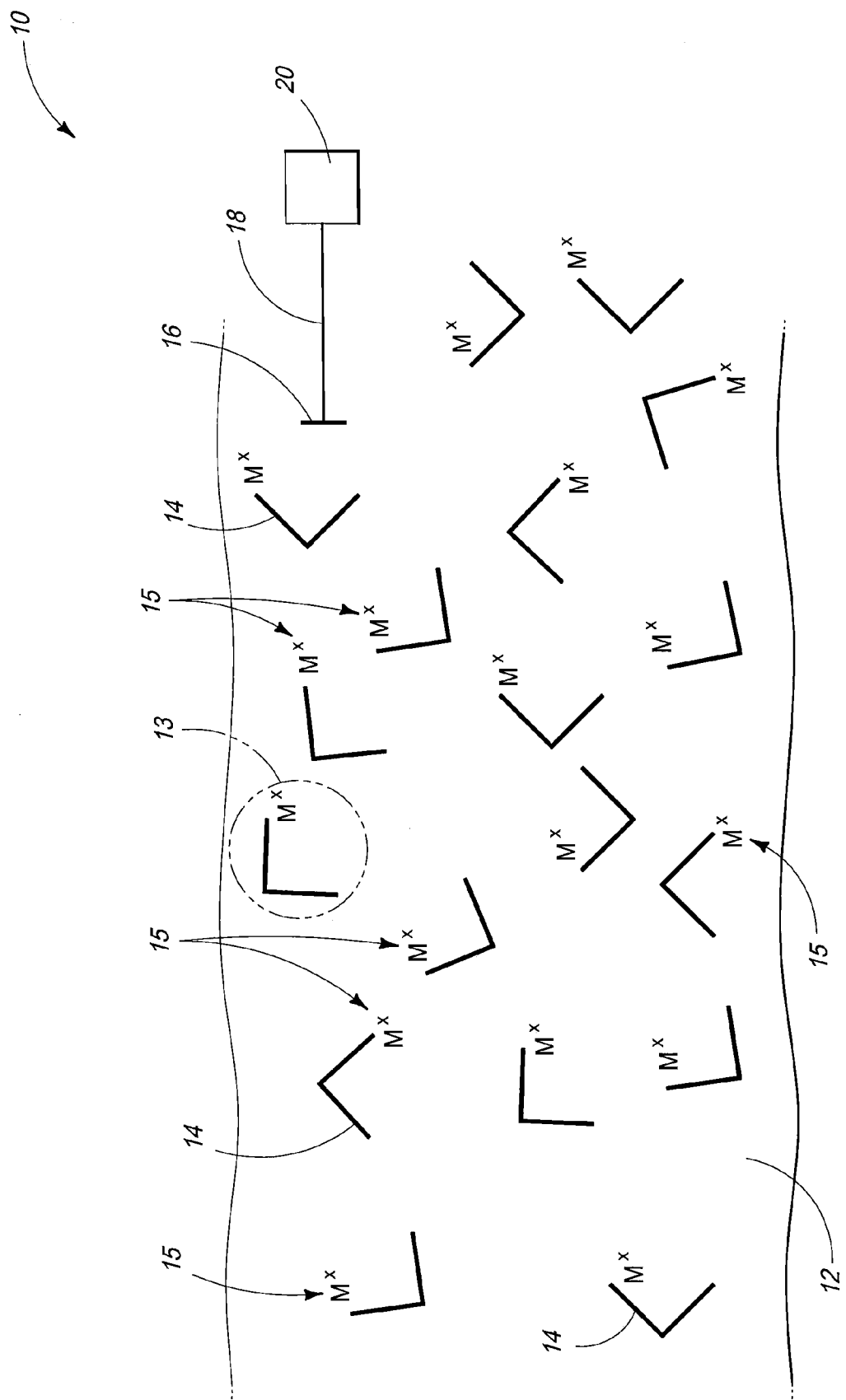
FIG. 1 is a configuration of a metal organic framework according to an embodiment of the disclosure.

The methods, systems, and assemblies of the present disclosure will be described with reference to FIGS. 1-9. Referring first to FIG. 1, a metal organic framework configuration 10 is shown that includes metal organic framework 12 conductively coupled via contact 16 and conductive conduit 18 to power source 20. Framework 12 can include metals coupled to organic components. Framework 12 may be configured to define open sites designed to receive guest materials. The open sites may be defined by more than one metal organic complex, for example. At least a portion of the metals of the metal organic framework should be electrically responsive. More than one metal may be included in metal organic complex 13 having organic portion 14 and metal portion 15.

Metal portion 15 of complex 13 can include metals and, according to example implementations, the oxidation state of at least some of the metals will change upon application of differing voltages to the framework. The metals can include transition state metals. In accordance with example implementations, upon changing the oxidation state of some of the metals, some of the previously open sites will become closed or some of the previously closed sites will become open to receive guest materials. Example metals can include Ti, Zr, Hf, Rf, V, Nb, Ta, Db, Cr, Mo, W, Sg, Mn, Tc, Re, Bh, Fe, Ru, Os, Hs, Co, Rh, Os, Hs, Co, Rh, Ir, Mt, Ni, pd, Pt, Ds, Cu, Ag, Au, Zn, and Rg. At least a portion of framework 12 can include one or more of these metals in a charged state.

For example metal portion 15 can include mixed valence metals ($M^{2+}/M^{3+}$) complexed with the organic portion; $M^{2+}$=Fe, Cd, Co, Cu, Mn, Ni, and Zn; and $M^{3+}$=Fe or Co, for example. According to specific implementations, the metal portion can include ($Fe^{2+}/Fe^{3+}$), and this metal may be complexed as $Fe_3^{2+}[Fe^{3+}(CN)_6]_2$ or $Fe_3^{3+}[Fe^{3+}(CN)_6]$, with the former being a different oxidation state than the latter under differing electrical conditions. These mixed valence metal complexes may include tetrakis[4-(pyridyl)oxamethyl]methane as an organic component, for example. Prussian blue having the metal complex $M^{3+}[Co(CN)_6]_2$ (M=Co, Zn), may be utilized as well. The guest material can contain carbon dioxide, for example. Mixed valence forms of the framework may show a greater affinity for carbon dioxide than univalent forms.

In accordance with example implementations, the organic portion 14 may be referred to as a ligand that coordinates the metal of the framework. The ligand may be multidentate, for example. The organic portion can be a conductive organic portion. Example organic portions can include but are not limited to straight chain hydrocarbon and/or aromatic rings. These metals may be complexed with organic portions such as 2,5-dihydroxy terephthalic acid (DHTA) which can form both the tetraainionic form 2,5-dioxido-1,4-benzenedicarboxylate (COBDC), wherein both the zyloxide and carboxylate moieties may act as ligands to the metal and the dianionic form 2,5-dihydroxy-1,4-benzene-dicarboxylate (DHBDC), where only the carboxylate moieties may act as ligands to the metal and the alcohol remains protonated. The metal organic complex can include metallocenes or calixarenes for example. In accordance with example implementations, the ligand of the metal organic complex can be substantially conductive. Example organic portions of the metal organic complex can include but are not limited to tetrakis[4-(pyridyl) oxamethyl]methane or p-tert-butylcalix[4]arene.

Contact 16 can be in electrical communication with at least a portion of the metal of the metal organic framework. In accordance with example implementations, contact 16 may be in electrical communication with the organic portion of the metal organic framework and the organic portion can provide electrical communication to at least a portion of the metal of the metal organic framework. Electrical input to contact 16 from power source 20 may be controlled with a controller (not shown). The controller may be programmable and/or may be coupled to a computer operating system (not shown). In accordance with example implementations, the controller may be manipulated to provide a desired voltage to framework 12, the voltage corresponding to the association/dissociation of guest materials. Utilizing the power source and the controller voltammetry as well as cyclic voltammetry can be applied to framework 12.

Framework 12 of FIG. 1 is depicted without a substrate. In accordance with example implementations, framework 12 may be associated with a substrate. In specific implementations, framework 12 may be bond to a substrate and/or supported by or within a substrate. In accordance with example configurations, framework 12 may be within a housing, such as a conduit, including tubular conduits. In accordance with other configurations, framework 12 may be supported by a substrate with the substrate being a substantially open support such as a platform, or in other configurations, framework 12 may be supported by the exterior of a conduit, such as tubular conduit configured to contain framework and/or other materials therein. In accordance with example implementations, framework 12 can be applied to or within a substrate as a thin film.

Figure 2:
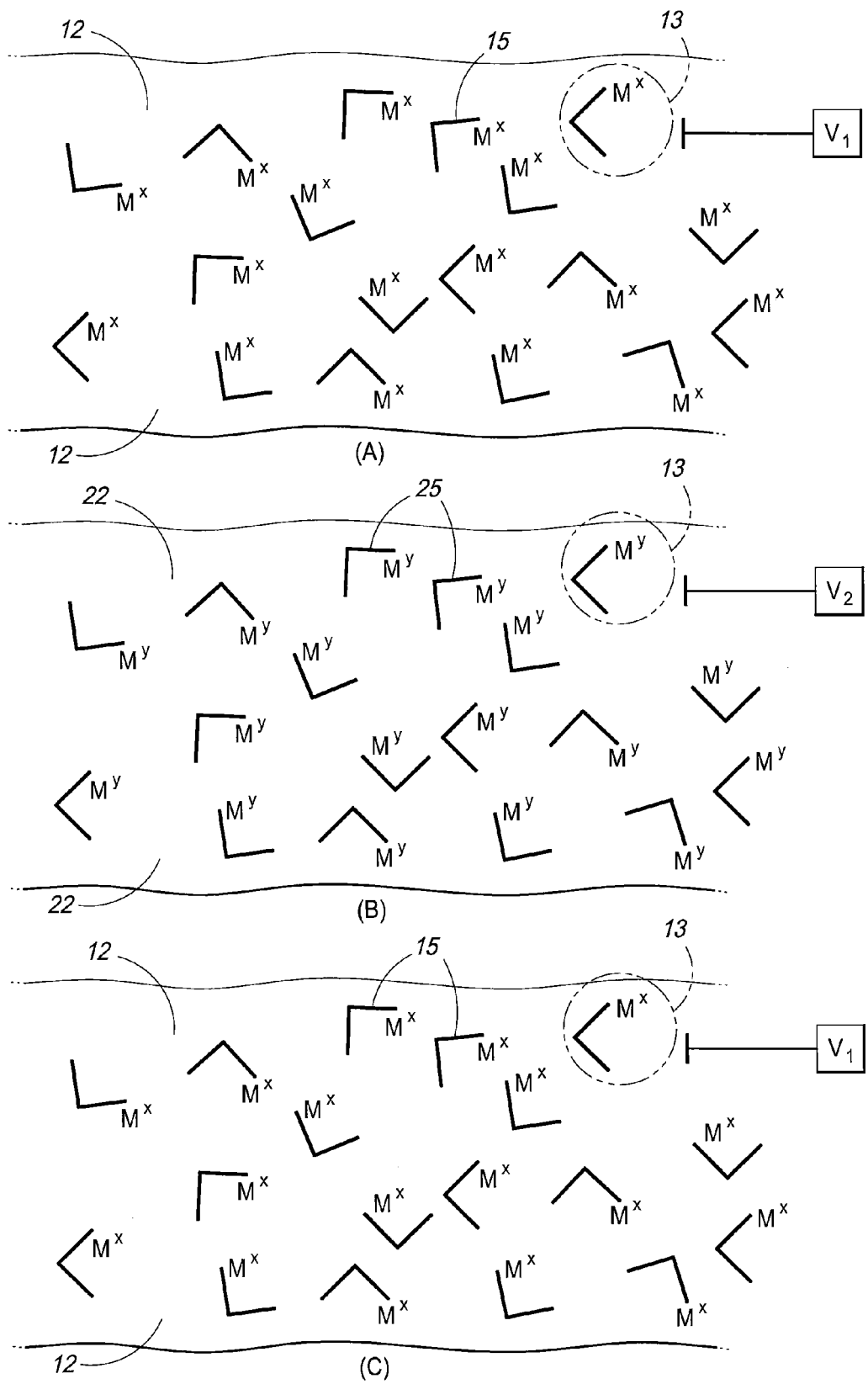
FIG. 2 represents configurations of metal organic frameworks according to an embodiment of the disclosure.

Referring next to FIG. 2, configurations of metal organic frameworks according to an embodiment of the disclosure are shown. Referring first to 2(A), framework 12 is depicted having a metal portion 15 ($M^x$), representing complex 13 having an $M^x$ oxidation state. Framework 12 has a voltage $V_1$ being applied thereto to maintain the $M^x$ oxidation state. Referring next to 2(B), framework 22 is shown having complex 13 with metal portion 25 ($M^y$), representing the $M^y$ oxidation state. Framework 22 has a voltage $V_2$ being applied thereto to maintain the $M^y$ oxidation state. In accordance with example implementations, the $M^x$ oxidation state is different than the $M^y$ oxidation state. The change in oxidation state can be facilitated by altering the voltage applied to the framework. As an example, frameworks 12 and 22 can be substantially the same, but with application of $V_1$ the oxidation state is $M^x$, and with application of $V_2$ the oxidation state is $M^y$. In accordance with example implementations, the metal of the metal organic framework can be electrochemically altered. According to example implementations the oxidation state of at least some of the metals of the metal organic framework can be changed by altering the voltage applied to the metal and/or the metal organic framework. In example implementations $V_1$ would be different than $V_2$. Referring next to 2(C), at least a portion of the framework 12 is shown having complexes 13 including portion 15 ($M^x$) having voltage $V_1$ being applied thereto. In accordance with example implementations, framework 22 of 2(B) can be altered to reflect framework 12 of 2(C) by altering $V_2$ to $V_1$. According to specific implementations, by transitioning from 2(A)-2(C), framework 12 can transition from having metal portions 15 through metal portions 25 to metal portions 15 again.

Figure 3:
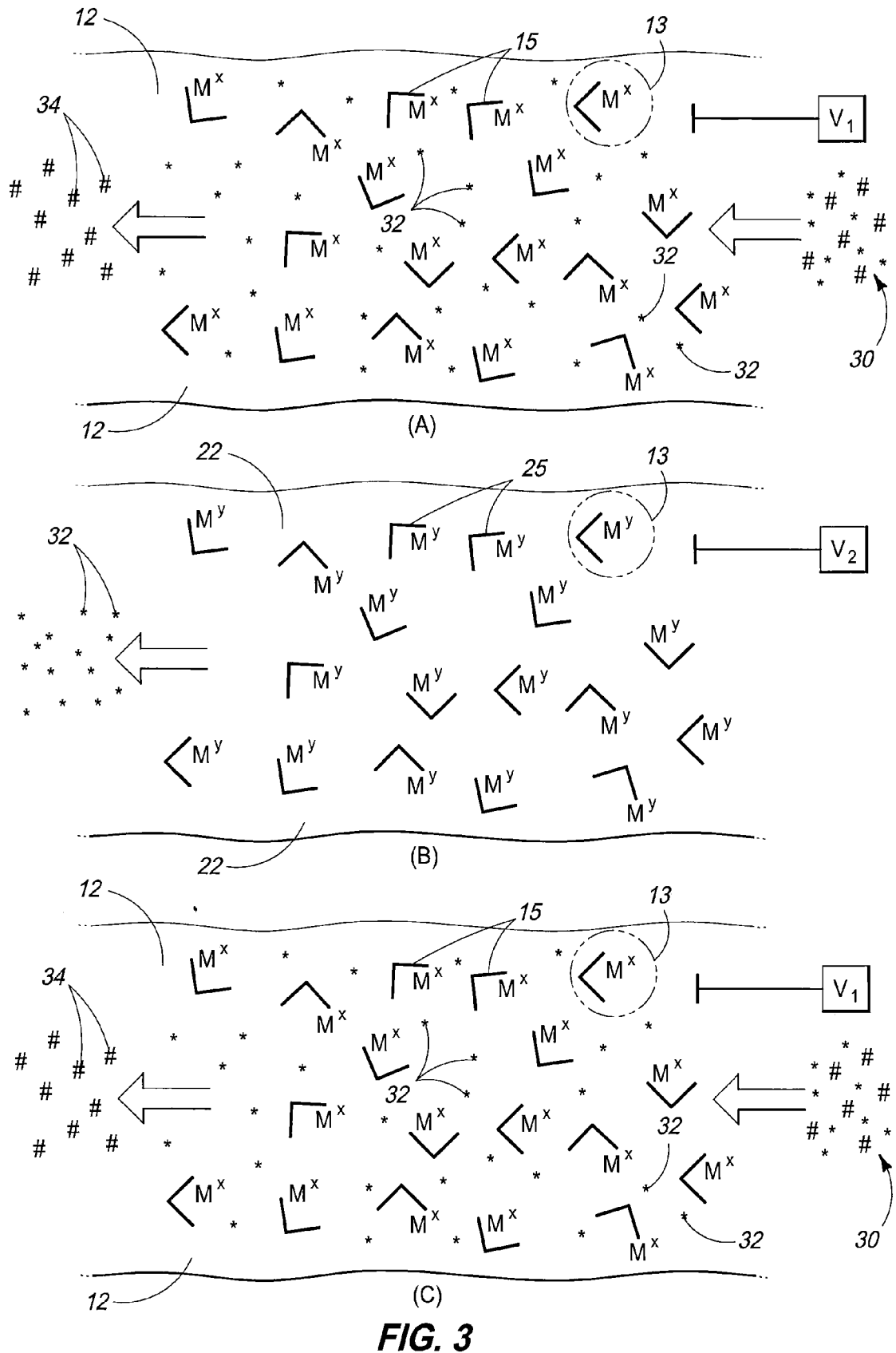
FIG. 3 represents configurations of metal organic framework and mixtures that include guest materials depicted according to an embodiment of the disclosure.

Referring next to FIG. 3, configurations of metal organic framework and mixtures that include guest materials are depicted according to an embodiment of the disclosure. Referring first to 3(A), framework 12 is shown having $V_1$ applied thereto to maintain $M^x$ oxidation states of at least some of metal portions 15 of complexes 13.

In accordance with example implementations, mixture 30 can be exposed or provided to framework 12. Mixture 30 can include guest material 32 (*). Material 32 can be a material that is desired to be separated from mixture 30. Example materials include but are not limited to carbon dioxide, and mixture 30 may include components of flue gas with the components other than carbon dioxide being represented as a remainder of the mixture 34 (#). Mixture 34 can further include combustion products and/or carbon dioxide and water for example. In accordance with other implementations, guest material 32 may be exposed or provided to framework 12 in substantially pure form. For example, carbon dioxide, hydrofluorocarbons (HFC's), refrigerants, $N_2$, He, butane, propane, pentane, ammonia, and freon may be desired as a guest material and metal organic frameworks having dynamically modifiable metal portions may be configured to associate with or adsorb same.

In accordance with 3(A), mixture 30 is provided to framework 12 and at least some of material 32 is retained while material 34 is not. Accordingly, methods for associating guest materials with a metal organic framework are provided with the method including altering the oxidation state of at least a portion of the metal of the metal organic framework to associate at least a portion of the guest materials with the framework. Further, methods for exposing a mixture to the metal organic framework are provided with the mixture comprising the guest materials and other materials, and at least a portion of the other materials not being associated with the metal organic framework upon the exposing. Referring to 3(B), $V_2$ can be applied to form framework 22 from framework 12 with framework 22 including complexes 13 having metal portions 25 ($M^y$). Upon changing at least some of the oxidation state of $M^x$ to $M^y$, at least some of guest material 32 dissociates or desorbs from framework 22 as substantially pure guest material 32. Accordingly, a method for releasing associated guest materials from a metal organic framework is provided with the method including altering the oxidation state of at least a portion of the metal of the metal organic framework to dissociate at least a portion of the guest materials from the framework. Referring to 3(C), $V_1$ can be applied to again substantially form framework 12 from framework 22 with framework 12 including complexes 13 having metal portions 15 ($M^x$). Upon returning the oxidation state of $M^y$ to $M^x$, mixture 30 can be exposed to framework 12 to associate or adsorb guest material 32 with or to framework 12.

In accordance with example implementations, Prussian Blue and Prussian Green analogs of metal organic frameworks can be synthesized. Synthesis of the mixed-metal organic sorbents based on Prussian blue analogues and DHTA sorbents can be performed. Prussian blues of chemical formula $M_3^{2+}[M^{3+}(CN)_6]_2 XH_2O$ can be prepared from octahedral $M^{3+}(CN)_6^{3-}$ complexes bridged unto a cubic lattice by $M^{2+}$ ions ($M^{3+}$=Co; $M^{2+}$=Cd, Co, Cu, Mn, Ni, Zn). Prussian blue analogues with two different oxidation states in the solid state, such as $Fe_3^{2+}[Fe^{3+}(CN)_6]_2$, and univalent oxidation state $Fe_3^{3+}[Fe^{3+}(CN)_6]$, can be synthesized for basic physical property and electrochemical characterization.

Additionally, mixed valance DHTA based metal-organic sorbents can be synthesized by dissolving 2,5-dihydroxyterephthalic acid in ethanol water mixture (1:1) in a Teflon autoclave. An aqueous sodium hydroxide solution can be added to this solution while stirring. Two salts containing metals in different oxidation states may then be dissolved in water in a 1:1 ratio and added to the Teflon autoclave, upon which a precipitate may form. After allowing the mixture to react at 110° C. for several days, a mixed valence state DHTA sorbent should form. Upon production of the desired mixed valence form, templating methods may be used to enhance yields.

Sorbent materials successfully synthesized can be fully characterized using various spectroscopic techniques including single-crystal x-ray diffraction, powder x-ray diffraction, BET surface analysis, differential scanning calorimetry, and thermogravimetric analysis. Adsorption isotherm data can be collected on both the multivalent and univalent forms to determine the net working adsorption capacity using an IGA-100 gas analyzer coupled with a breakthrough reactor and mass spectrometer. The IGA-100 is designed to study the multicomponent gas and/or vapor sorption processes from vacuum to high pressure under dynamic flow-through conditions. Mixtures of up to three different gases can be introduced in the system.

In accordance with example implementations, Fe(2+) and Fe(3+) oxidation states can be synthesized by adding the saturated solution of $K_4[Fe(CN)_6]$ (1.39 g in 5 mL of DI water) to a saturated solution of Fe(3+)$Cl_3$ (3.7 g in 5 mL of DI water) at room temperature. Upon the addition of $K_4[Fe(CN)_6]$, the color of the reaction mixture can change to blue spontaneously indicating the formation of Prussian blue. Filtration can follow with washings of water leading to the formation of pure Prussian blue ($Fe_3^{2+}[Fe^{3+}(CN)_6]_2$). Prussian green may also be synthesized by hydrothermal reaction of $K_3[Fe(CN)_6]$ and $Na_2S_2O_3$ in 10 ml of DI water followed by the autoclave heating at 130° C. for two days, which can result in the formation of a solid green product.

To evaluate the uptake of gas materials such as $CO_2$ at room temperature, both the green and blue samples can be activated overnight at 150° C. The blue material can show uptake of 10 wt % $CO_2$ selectively over $N_2$ at 1 bar pressure with the Prussian green not showing any $CO_2$ uptake. In accordance with example implementations, it has been demonstrated that the oxidized form of this metal organic framework can result in the collapse of cavities present in the mixed valence form.

Figure 4:
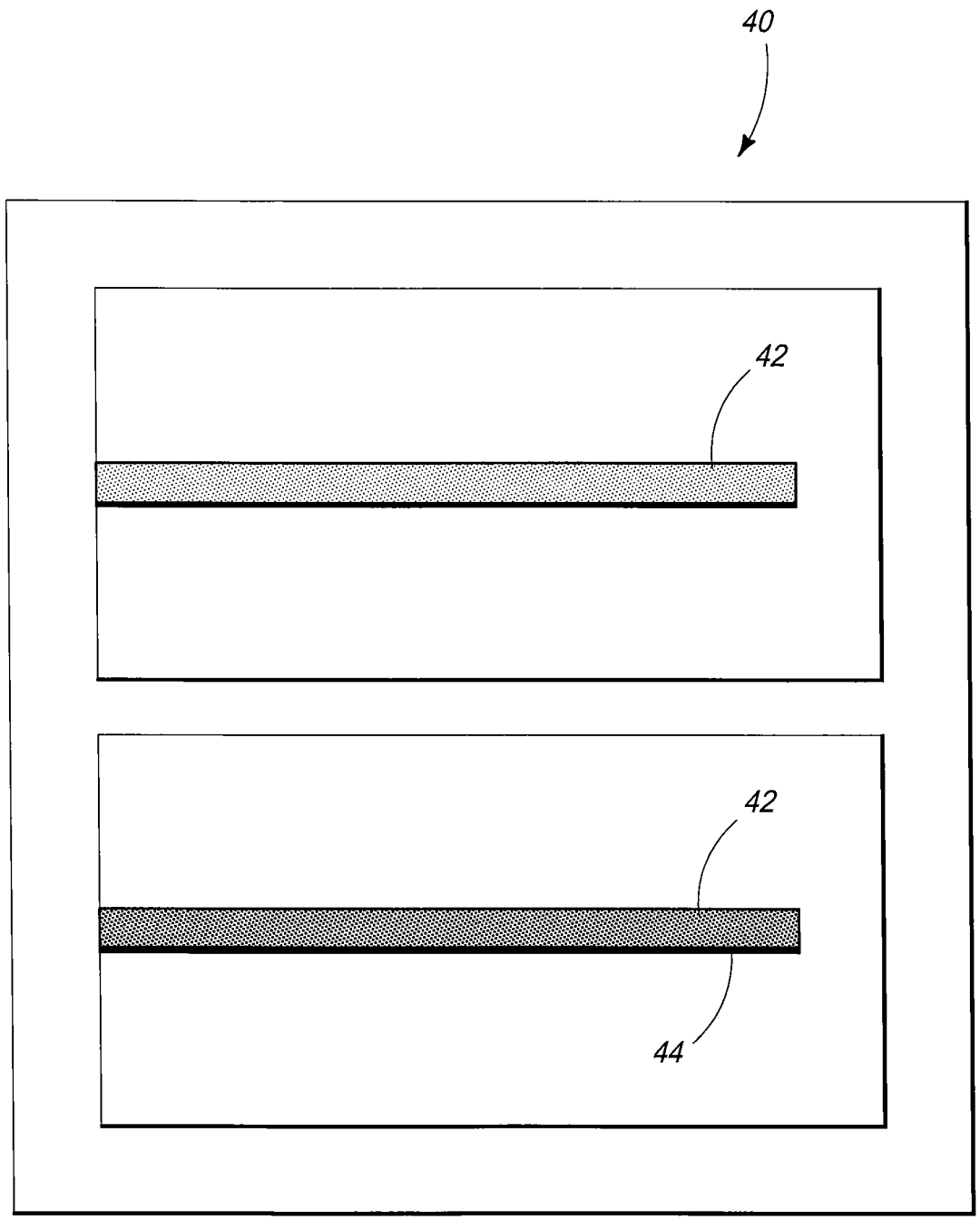
FIG. 4 is an example metal organic framework according to an embodiment of the disclosure.

Prussian blue thin films can be deposited on glassy carbon PEEK incased electrodes using prepared 0.01 M solutions of $FeCl_3$ and $K_3[Fe(CN)_6]$ using 0.01 N HCl. Repetitive potential cycling between 1.0 and −0.20 V versus Ag/AgCl of GCE in the equimolar solution of $FeCl_3$ and $K_3[Fe(CN)_6]$ can result in the formation of Prussian blue thin film as represented in FIG. 4, wherein the glassy carbon PEEK electrode is represented as 42 and the thin film Prussian blue 44 is demonstrated as electrically deposited on electrode 42. The electrode can be thoroughly rinsed with water and transferred to another cell containing 1 M KCl solution. The electrodes can be subjected to repetitive potential cycling between 1.0 and −0.20 V versus Ag/AgCl at 0.1 V/s. Cyclic voltammetry measurements can demonstrate the reduction and the oxidation of Fe(2+)/Fe(3+) upon cycling the potentials between 0.16 V and 0.8 V.

Figure 5:
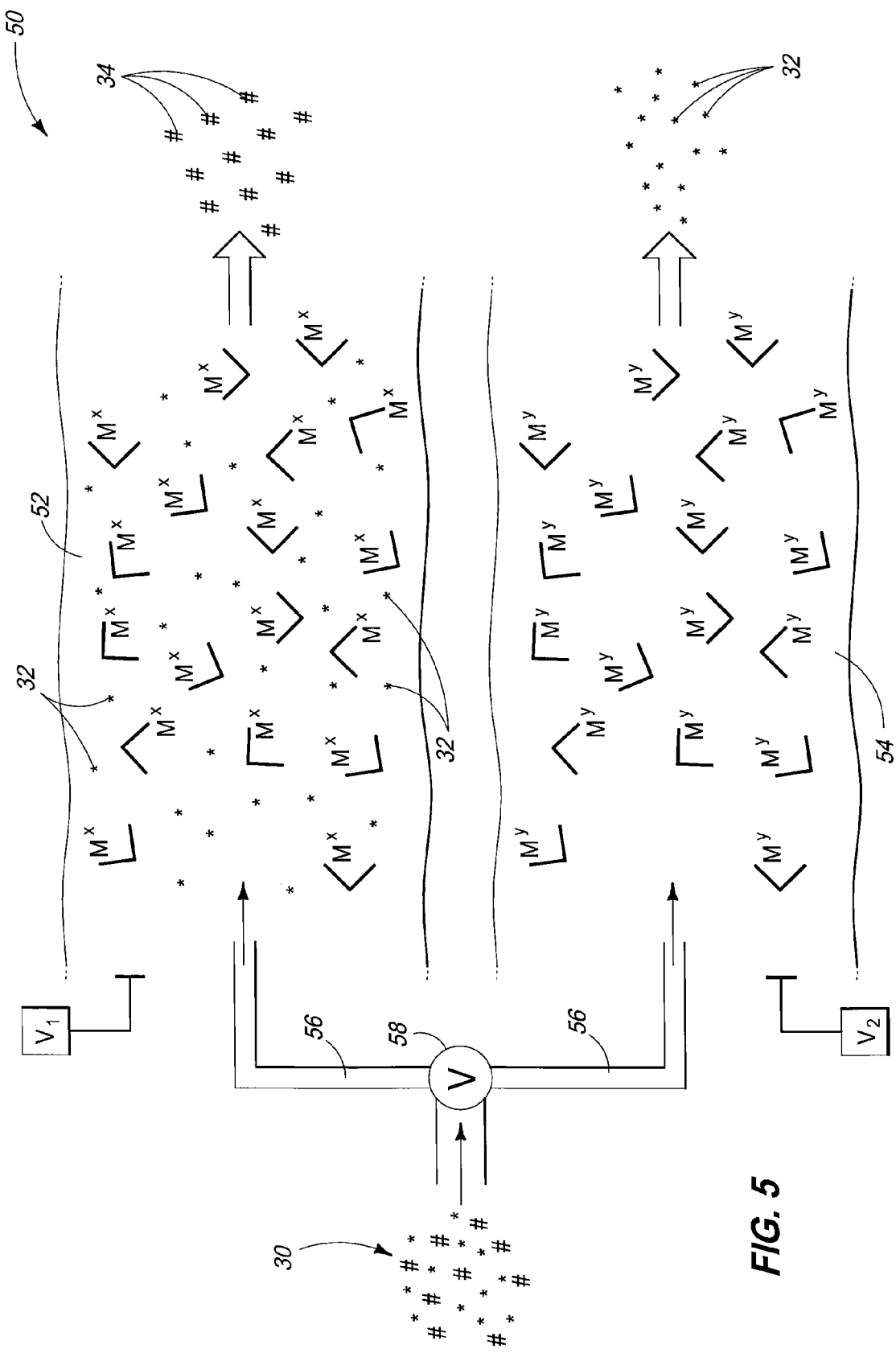
FIG. 5 represents a configuration of metal organic framework according to an embodiment of the disclosure.

In accordance with 3(A)-3(B) and with reference to FIG. 5, methods for selectively associating or dissociating guest materials with a metal organic framework are provided. The methods can include altering the oxidation state of at least a portion of the metal of the metal organic framework to associate or dissociate at least a portion of the guest materials with the framework. These methods can also include exposing a mixture to the metal organic framework with the mixture including the guest materials and other materials. At least a portion of the other materials may not be associated with the metal organic framework upon the exposing, for example. In accordance with example implementations, the methods can include: ceasing the exposing; altering the oxidation state of the portion of the metal; and dissociating at least a portion of the guest materials from the metal organic framework. Further, the methods can include, after the dissociating, altering the oxidation state of the portion of the metal to return the oxidation state to an associating oxidation state; after the altering, exposing the mixture to the metal organic framework; and associating at least a portion of the guest material of the mixture with the metal organic framework. In accordance with implementations of these methods, the altering can include applying a predetermined voltage to the metal organic framework.

Referring to FIG. 5 an example system 50 including metal organic frameworks 52 and 54 is shown according to an embodiment of the disclosure. In accordance with example implementations, system 50 can be a system for associating or dissociating guest materials within a series of metal organic frameworks. System 50 can include at least two individual metal organic frameworks 52 and 54 respectively. Metal organic framework 54 can be configured to dissociate guest materials 32 and framework 52 can be configured to associate guest material 32. In accordance with an example embodiment, framework 54 includes at least some metals of one oxidation state ($M^y$) and framework 52 includes the same metals of another oxidation state ($M^x$). While not shown, system 50 can include a power source, and a controller operatively coupled to both the power source and the metal organic frameworks ($V_1$ and $V_2$). System 50 can also include a conduit 56 extending to a valve 58 in fluid communication with both metal organic frameworks 52 and 54. Valve 58 may be operable by a motor (not shown) and system 50 can include a controller (not shown) configured to operate the motor of valve 58 as well as the power supply to $V_1$ and $V_2$. Accordingly, system 50 may be configured to continuously adsorb and desorb guest materials from the frameworks by selectively providing and denying mixture to individual frameworks having metals of differing oxidation states. Valve 58 can be cycled consistent with $V_1$ and $V_2$ to alternatively desorb and adsorb from alternative frameworks as desired or dictated by the controller and/or computer system (not shown).

Figure 6:
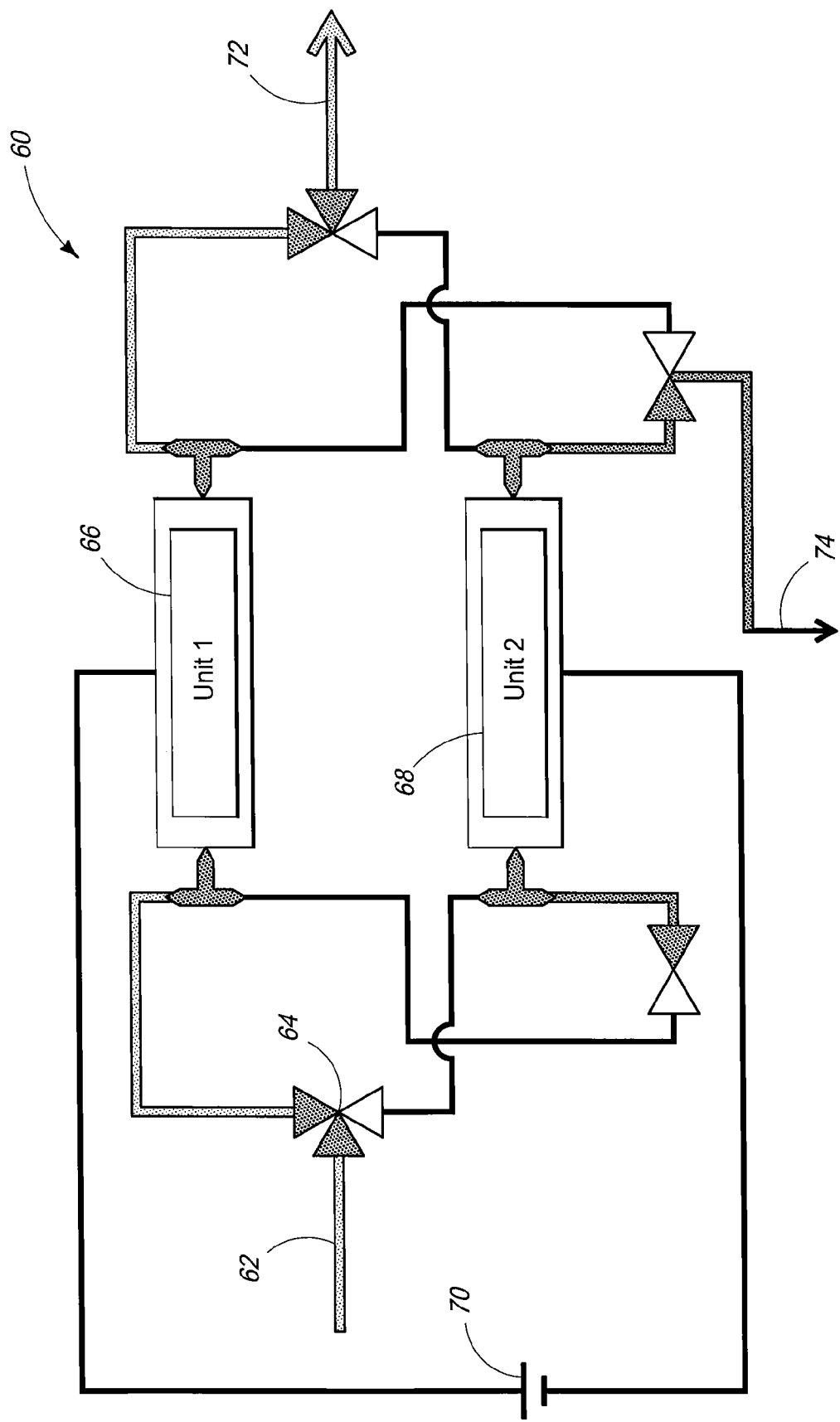
FIG. 6 represents a system including metal organic frameworks according to an embodiment of the disclosure.

Referring next to FIG. 6, system 60 is shown that includes frameworks 66 and 68 coupled to power source 70 and fluid communication with inlet 62. In accordance with example implementations, system 60 may be utilized to segregate carbon dioxide from flue gas and hence flue can be provided to inlet 62 and selectively provided to one of frameworks 66 or 68 via valves/conduit assembly 64. In accordance with example implementations, while flue gas is being provided to one of frameworks 66 and 68, the other of the frameworks can be desorbing guest materials to outlet 74. An example guest material is carbon dioxide. Likewise, while the one framework is being provided the flue gas, a portion of the flue gas not retained, such as nitrogen can be provided to outlet 72. In accordance with example implementations, system 60 can be operable via a computer system as described herein.

Figure 7:
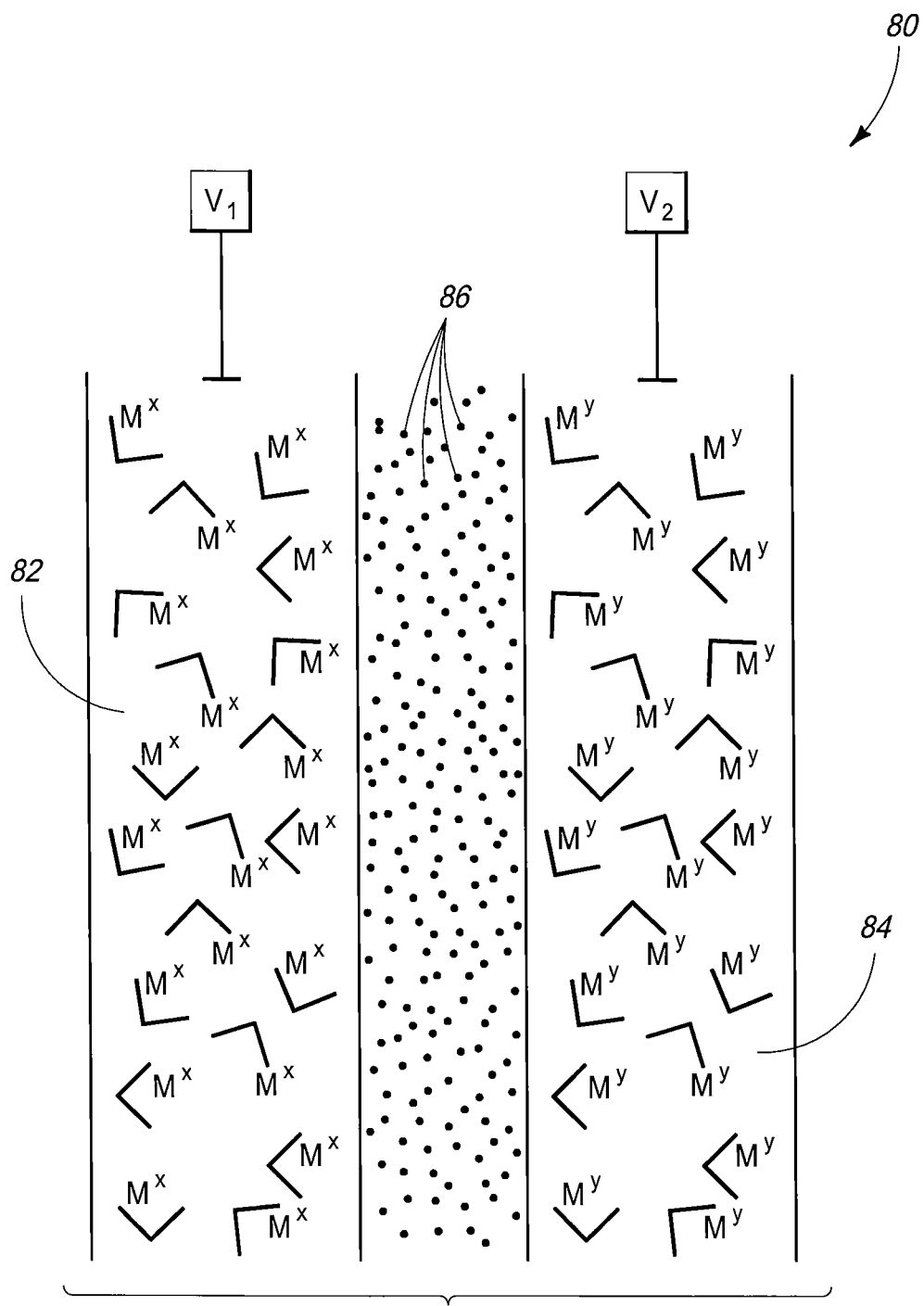
FIG. 7 represents a system including metal organic framework according to an embodiment of the disclosure.

Referring to FIG. 7, system 80 is shown that includes at least two frameworks 82 and 84 separated by an electrolyte 86. In the shown embodiment, $V_1$ can be applied to framework 82 to facilitate the formation of metals of one oxidation state ($M^x$), and $V_2$ can be applied to framework 84 to facilitate the formation of metals of another oxidation state ($M^y$). Electrolyte 86 can be a solid state conducting polymer that is porous. According to example implementations, electrolyte 86 can be sufficiently porous to allow guest materials to pass and/or migrate through.

Electrolyte 86 can be a non-aqueous porous solid or a gel-type polymer. Electrolyte 86 can be configured to facilitate $CO_2$ gas transport through the electrolyte bridge in the electrochemical cell. Electrolyte 86 may take the form of a polymerized ionic liquid membrane, for example. Electrolyte 86 may also be a room-temperature ionic liquid such as those reported as promising solvents for lithium ion batteries and salts for supercapacitors. Consistent with this, electrolyte 86 can be a supported porous polymer incorporating an ionic liquid conducting medium.

The hydrophobic room temperature ionic liquids of electrolyte 86 can be those containing dialkyl imidazolium as cation and bis(trifluromethanesulfonyl)imide as anion, such as 1-ethyl-3-methylimidazolium bis(trifluromethanesulfonyl)imide (EMI-TFSI), 1-butyl-3-methylimidazolium bis(trifluromethanesulfonyl)imide (BMI-TFSI), for example. The synthesis of these ionic liquids is consistent with that which is reported in literature.

The polymerized ionic liquid of electrolyte 86 can be chosen from the side-chain poly(imidazolium) and the main-chain poly(imidazolium)s (i.e. imidazolium ionenes) with adjustable alkylene spacers-). Both types of poly(imidazolium)s can be synthesized following the procedures reported in the literature. The poly(imidazolium) polymers can be dissolved in certain organic solvents with low boiling point and then mixed with liquid electrolytes prepared by dissolving salts such as potassium bis(trifluromethanesulfonyl)imide (KTFSI) in the room temperature ionic liquids.

In accordance with an example preparation of a system, the non-woven porous polymer or fabric sheet can be immersed into the above poly(imidazolium) electrolyte solution and then taken out of the solution. After removing the low boiling point organic solvent, via evaporation for example, the porous gel polymer electrolyte separator can be formed.

The electrochemical cell can then be formed by placing the porous gel polymer electrolyte separator in between two pieces of the porous electrode sheets deposited with sorbent and coated with the polymer gel electrolyte. Once formed, the next step can involve deposition of the electrically responsive sorbent on the surface and construction of the complete electrochemical system.

Desorption of trace gases and $CO_2$ by the electrochemical switching may occur at different electrode potentials with some sorbents. Hence, periodic regeneration at higher applied potential may be required to maintain sorbent performance after prolonged exposure to $SO_2$ and other trace gases. Effluent gases from the cell can be analyzed with an in-line mass spectrometer system to enable tracking of $CO_2$ capture performance over the course of each test run. In addition, the system can be equipped with thermocouples and current/voltage monitoring equipment to track power consumption and electrical performance characteristics.

In accordance with example implementations system 80 can be operated as an electrical cell with cyclic voltammetry being applied to both $V_1$ and $V_2$. In this configuration, one framework may be considered an anode with the other being considered a cathode. Mixtures can be exposed to either or both of frameworks 82 and 84, and desired guest materials retained/desorbed in accordance with the oxidation state of the metals with the metal organic framework. In accordance with example implementations, flue gas can be exposed to frameworks 82 or 84 and carbon dioxide provided to and/or through electrolyte 86 for eventual capture.

Figure 8:
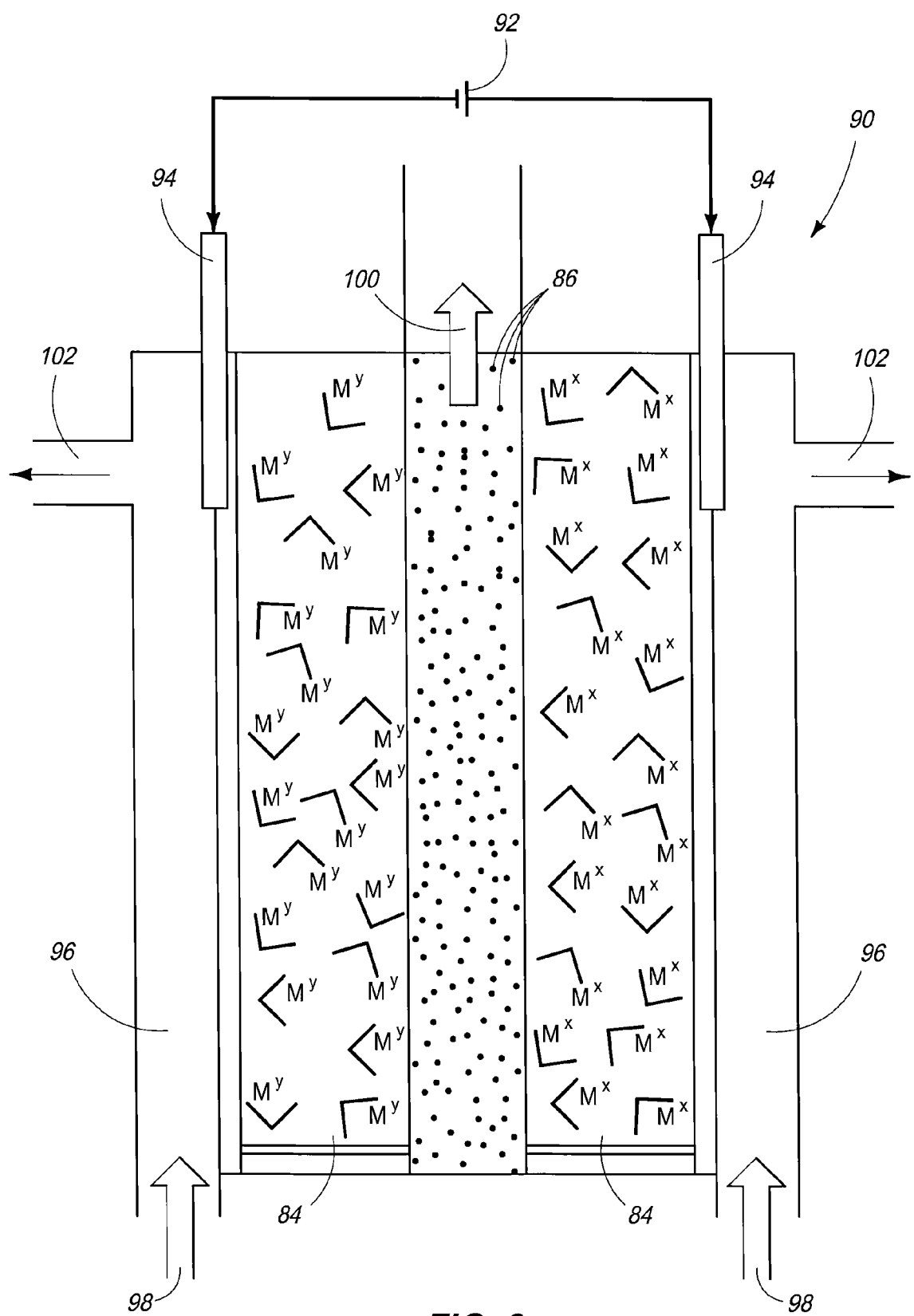
FIG. 8 represents a system including metal organic framework according to an embodiment of the disclosure.

Referring next to FIG. 8, system 90 can further include power source 92 electrically coupled to electrodes 94 and controlled by a controller (not shown). In accordance with example implementations, the controller can be configured to provide cyclic voltammetry to frameworks 82 and 84. Conduit 96 can extend along an edge of frameworks 82 and 84, with the conduit being configured to expose the framework to mixture 98 such as a flue gas or combustion product. Upon exposure to the framework, guest materials such as carbon dioxide can be associated or adsorbed and subsequently dissociated or desorbed into electrolyte 86 and conveyed to outlet 100 while the remaining materials of the mixture such as $N_2$ are conveyed to outlets 102. To facilitate the migration of guest materials and/or remaining materials through desired outlets, the back pressure to the outlets can be manipulated.

Figure 9:
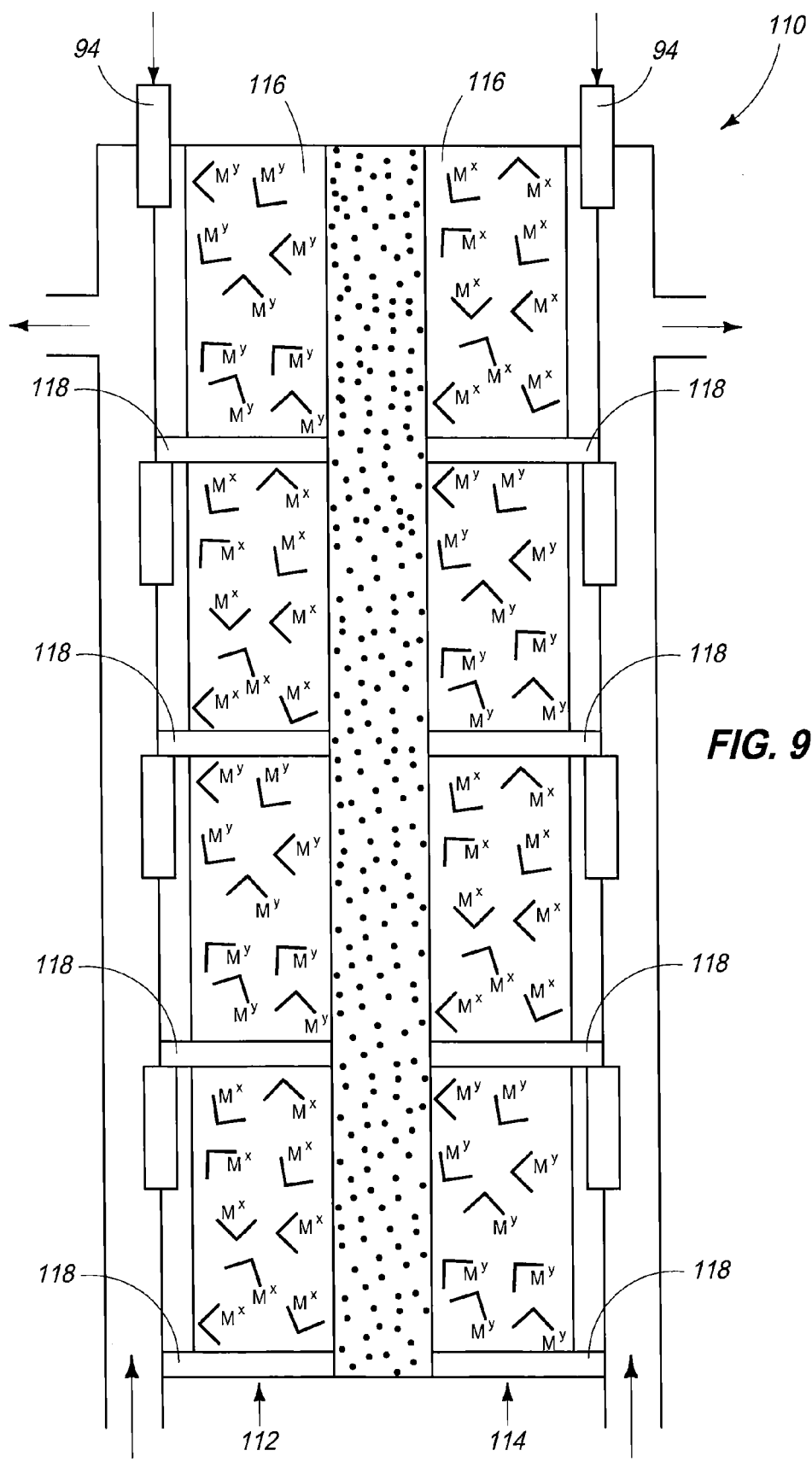
FIG. 9 represents electrolyte structures according to an embodiment of the disclosure.

Referring next to FIG. 9, system 110 is shown that includes at least two series of alternating frameworks, series 112 and 114. The series include individual frameworks electrically isolated from one another by separator 118 which can be constructed of insulative material. Series 112 and 114 can be aligned in relation to one another to facilitate pairs 116 lateral of one another. Pairs 116 can include a framework of one configuration and a framework of another configuration. As with system 90, a mixture can be provided to the system to selectively separate a desired guest material, such as providing flue gas and separating carbon dioxide.

Accordingly, gas separation assemblies are provided that can include a plurality of individual cells housing metal organic framework. The plurality can be configured as at least one series of cells and another series of cells. Each of the series can include at least two electrically isolated individual cells. The assembly can include a channel, such as the channel of electrolyte 86 between the one series of cells and the other series of cells. In accordance with example implementations, the one series can be aligned laterally of the other series, and the individual cells of the one series are aligned lateral to the individual cells of the other series to form a pair of cells, for example. With regard to the pairs of cells, one of the pair of cells can be configured to dissociate guest materials, and the other of the pair of cells can be configured to associate guest materials. The assembly can include conduits extending along the perimeter of each of the series of cells, with the conduits configured to expose the metal organic framework of each of the cells of each of the series. One series of cells can be in fluid communication with one conduit, and the other series of cells can be in fluid communication with another conduit.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. An electrochemical cell comprising:
   at least two individual cells;
   one of the two cells comprising metal organic framework having one oxidation state;
   another of the two cells comprising metal organic framework having another oxidation state, the one oxidation state being different than the other oxidation state.

2. The electrochemical cell of claim 1 wherein one or the other metal organic frameworks of the one or the other cells is configured to bind with a guest material.

3. The electrochemical cell of claim 1 wherein at least a portion of either one or the other of the metal of the metal organic framework is a transition metal.

4. The electrochemical cell of claim 1 wherein the metal of the metal organic framework is one or more of Ti, Zr, Hf, Rf, V, Nb, Ta, Db, Cr, Mo, W, Sg, Mn, Tc, Re, Bh, Fe, Ru, Os, Hs, Co, Rh, Os, Hs, Co, Rh, Ir, Mt, Ni, Pd, Pt, Ds, Cu, Ag, Au, and Rg.

5. The electrochemical cell of claim 1 wherein at least a portion of either one or the other of the metal organic framework comprises a substantially conductive organic ligand.

6. A method of separating carbon dioxide from a mixture comprising carbon dioxide, the method comprising:
   providing a mixture to at least one cell and associating the carbon dioxide of the mixture with a metal organic framework of the one cell; and
   altering the oxidation state of the metal organic framework to disassociate at least some of the carbon dioxide from the metal organic framework.

7. The method of claim 6 wherein the mixture comprises flue gas.

8. The method of claim 6 further comprising while providing the mixture to the cell, disassociating carbon dioxide from another cell, the metal organic framework of the one cell having a different oxidation state than the metal organic framework of the other cell.

9. The method of claim 8 further comprising alternatively associating carbon dioxide with the one cell and disassociating carbon dioxide from the other cell to separate carbon dioxide from the mixture.

10. The method of claim 8 wherein the metal organic framework of the one cell comprises ($M^{2+}/M^{3+}$) and the other cell comprises ($M^{3+}/M^{3+}$).

11. The method of claim 8 further comprising cycling the mixture between the one and another cell.

12. A method of separating one or more carbon compounds from a mixture comprising carbon compounds, the method comprising:
   providing a mixture to at least one cell and associating the carbon compound of the mixture with a metal organic framework of the one cell, the carbon compound comprising carbon dioxide, hydrofluorocarbons, refrigerants, butane, propane, pentane, and/or freon; and
   altering the oxidation state of the metal organic framework to disassociate at least some of the carbon compound from the metal organic framework.

13. The method of claim 12 further comprising while providing the mixture to the cell, disassociating carbon compound from another cell, the metal organic framework of the one cell having a different oxidation state than the metal organic framework of the other cell.

14. The method of claim 13 further comprising alternatively associating the carbon compound with the one cell and disassociating the carbon compound from the other cell to separate the carbon compound from the mixture.

15. The method of claim 13 wherein the metal organic framework of the one cell comprises ($M^{2+}/M^{3+}$) and the other cell comprises ($M^{3+}/M^{3+}$).

16. The method of claim 13 further comprising cycling the mixture between the one and another cell.

* * * * *